United States Patent
Bergman et al.

(10) Patent No.: US 11,444,728 B2
(45) Date of Patent: Sep. 13, 2022

(54) UPLINK HARQ-ACK FEEDBACK FOR MTC

(71) Applicant: TELEFONAKTIEBOLAGET LM ERICSSON (PUBL), Stockholm (SE)

(72) Inventors: Johan Bergman, Stockholm (SE); Johan Hultell, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/486,324

(22) PCT Filed: Mar. 16, 2018

(86) PCT No.: PCT/IB2018/051776
§ 371 (c)(1),
(2) Date: Aug. 15, 2019

(87) PCT Pub. No.: WO2018/172896
PCT Pub. Date: Sep. 27, 2018

(65) Prior Publication Data
US 2020/0014498 A1   Jan. 9, 2020

Related U.S. Application Data

(60) Provisional application No. 62/476,424, filed on Mar. 24, 2017.

(51) Int. Cl.
*H04L 1/18* (2006.01)
*H04L 1/00* (2006.01)
*H04L 1/16* (2006.01)

(52) U.S. Cl.
CPC .......... *H04L 1/1848* (2013.01); *H04L 1/001* (2013.01); *H04L 1/0004* (2013.01);
(Continued)

(58) Field of Classification Search
CPC ... H04L 1/1671; H04L 1/0003; H04L 1/0004; H04L 1/0009; H04L 1/001; H04L 1/0025;
(Continued)

(56) References Cited

U.S. PATENT DOCUMENTS

2012/0307775 A1* 12/2012 Chung ................ H04L 1/1671
370/329
2013/0083740 A1* 4/2013 Eriksson ............. H04L 1/1861
370/329

(Continued)

FOREIGN PATENT DOCUMENTS

CN    104811284 A       7/2015
CN    107347002 A *  11/2017  ............... H04L 1/00
(Continued)

OTHER PUBLICATIONS

LG Electronics. "Discussion on scheduling and HARQ feedback for NR", Feb. 13-17, 2017, LG Electronics, 3GPP TSG RAN WG1 Meeting #88 R1-1702486, Total pp. 8 (Year: 2017).*
(Continued)

*Primary Examiner* — Shah M Rahman
(74) *Attorney, Agent, or Firm* — Sage Patent Group

(57) ABSTRACT

Systems and methods for efficient signaling Hybrid Automatic Repeat Request Acknowledgement (HARQ-ACK) for an uplink data transmission are disclosed. In some embodiments, a method of signaling HARQ-ACK feedback for an uplink data transmission sent from a wireless device to a radio network node comprises obtaining HARQ-ACK feedback for the uplink data transmission, encoding the obtained HARQ-ACK feedback on to an unused bit combination of a field in a downlink control channel, and transmitting the downlink control channel to the wireless device. Embodiments of the present disclosure enable wireless device power saving using positive HARQ-ACK feedback without increasing the static downlink control signaling overhead
(Continued)

and without reducing coverage for downlink control information.

11 Claims, 8 Drawing Sheets

(52) U.S. Cl.
CPC .......... *H04L 1/1671* (2013.01); *H04L 1/1812* (2013.01); *H04L 1/1896* (2013.01)

(58) Field of Classification Search
CPC ... H04L 1/0079; H04L 1/1812; H04L 1/1848; H04L 1/1896
See application file for complete search history.

(56) References Cited

U.S. PATENT DOCUMENTS

| | | | |
|---|---|---|---|
| 2015/0092645 A1 | 4/2015 | Tabet et al. | |
| 2015/0244619 A1 | 8/2015 | Zheng et al. | |
| 2016/0100422 A1* | 4/2016 | Papasakellariou | H04L 1/1861 370/329 |
| 2016/0353443 A1* | 12/2016 | Desai | H04L 5/1469 |
| 2017/0171866 A1* | 6/2017 | Cheng | H04W 72/0426 |
| 2017/0303248 A1* | 10/2017 | Chatterjee | H04W 72/042 |
| 2017/0311294 A1* | 10/2017 | Kim | H04L 1/0045 |
| 2017/0359826 A1* | 12/2017 | Islam | H04W 72/042 |
| 2018/0175986 A1* | 6/2018 | Chendamarai Kannan | H04L 5/005 |
| 2018/0213379 A1* | 7/2018 | Xiong | H04W 40/22 |
| 2018/0227936 A1* | 8/2018 | Yerramalli | H04L 27/2662 |
| 2018/0235003 A1* | 8/2018 | Wong | H04W 72/042 |
| 2018/0263061 A1* | 9/2018 | Moroga | H04W 72/04 |
| 2018/0295612 A1* | 10/2018 | Yi | H04B 1/7156 |
| 2019/0068331 A1* | 2/2019 | Lee | H04L 1/18 |
| 2019/0081743 A1* | 3/2019 | Loehr | H04L 1/1887 |
| 2019/0199477 A1* | 6/2019 | Park | H04L 1/0693 |
| 2019/0372720 A1* | 12/2019 | Lee | H04W 72/14 |
| 2020/0037367 A1* | 1/2020 | Kim | H04W 74/006 |
| 2020/0213040 A1* | 7/2020 | Takeda | H04W 4/70 |

FOREIGN PATENT DOCUMENTS

| | | | |
|---|---|---|---|
| EP | 3226456 A1 * | 10/2017 | .......... H04L 1/1851 |
| RU | 2504081 C1 | 1/2014 | |
| WO | 2011000110 A2 | 1/2011 | |
| WO | 2011013986 A2 | 2/2011 | |
| WO | 2011026236 A1 | 3/2011 | |
| WO | 2011026355 A1 | 3/2011 | |
| WO | WO-2015114459 A1 * | 8/2015 | .......... H04L 1/1671 |
| WO | 2016028125 A2 | 2/2016 | |

OTHER PUBLICATIONS

Samsung, "HARQ-ACK for PUSCH", 3GPP TSG RAN WG1 #83 R1-156745, Anaheim, USA, Nov. 16-20, 2015, Total Pages: 2 (Year: 2015).*
Notice of Reasons for Rejection for Japanese Patent Application No. 2019-552050 dated Jan. 26, 2021, 8 pages.
LG Electronics, "Discussion on scheduling and HARQ feedback for NR", 3GPP TSG RAN WG1 Meeting #88, Athens, Greece Feb. 13-17, 2017, R1-1702486, 8 pages.
LG Electronics, "Details on DCI contents for MTC.", 3GPP TSG RAN WG1 #82, R1-154234, Aug. 14, 2015.

* cited by examiner

UPLINK HARQ-ACK FEEDBACK FOR MTC

RELATED APPLICATIONS

This application is a 371 of International Application No. PCT/IB2018/051776, filed Mar. 16, 2018, which claims the benefit of U.S. Provisional Application No. 62/476,424, filed Mar. 24, 2017, the disclosures of which are hereby incorporated herein by reference in their entirety.

TECHNICAL FIELD

Long Term Evolution (LTE), Machine Type Communication (MTC), Hybrid Automatic Repeat Request (HARQ)

BACKGROUND

Machine Type Communication (MTC)

Long Term Evolution (LTE) Release 13 introduces a Bandwidth-reduced Low-complexity (BL) User Equipment device (UE) type in the form of a new UE category M1 (Cat-M1). Compared to earlier LTE UE categories, Cat-M1 is associated with relaxed performance requirements in order to enable low-cost device implementations with low power consumption and characteristics suitable for many MTC applications. Cat-M1 is defined in [1]. Compared to higher LTE UE categories, a Cat-M1 UE supports a smaller maximum transport block size (1000 bits) and a smaller maximum channel bandwidth (6 Physical Resource Blocks (PRBs)) and can fulfill the standardized performance requirements using just a single receive antenna. The transmissions to and from a Cat-M1 UE are restricted to a narrowband spanning 6 PRBs [2][3][4].

LTE Release 13 also introduces two Coverage Enhancement (CE) modes called CE mode A and CE mode B. Note that CE modes are also sometimes referred to herein as "coverage enhanced modes," but the terms are used herein as synonyms. The coverage enhancement in these CE modes is mainly achieved through subframe repetition of LTE physical channels such as the Physical Uplink Shared Channel (PUSCH). CE mode A supports moderate CE through a small number of subframe repetitions for PUSCH and other physical channels, and CE mode B supports large CE through many subframe repetitions for PUSCH and other physical channels. UEs operating in CE mode are referred to as CE UEs [2][3][4].

Uplink Hybrid Automatic Repeat Request (HARQ) Acknowledgement (ACK) Feedback The 3GPP LTE Release 15 work item on "Even further enhanced MTC for LTE" [5] has the following work item objective for MTCs for BL/CE UEs:
Power consumption reduction for physical channels
Study and, if found beneficial for connected mode, specify physical signal/channel/Downlink Control Information (DCI) for HARQ-ACK feedback in downlink for data transmission in uplink.
The uplink HARQ operation for BL/CE UEs is asynchronous [6] and there is no explicit positive HARQ-ACK feedback sent from the enhanced or evolved Node B (eNB) to let the UE know whether an uplink data transmission on PUSCH was successfully received or not.

When the uplink traffic is relatively frequent, the UE receives an implicit positive HARQ-ACK feedback for the previous uplink data transmission when it is scheduled with a new uplink data transmission using the same PUSCH HARQ process with the New Data Indicator (NDI) bit toggled.

However, when the uplink traffic is relatively infrequent, the UE may not receive any implicit positive HARQ-ACK feedback for an uplink data transmission since there is no immediate next uplink data transmission with the NDI bit toggled. The UE will wait until a higher layer uplink HARQ retransmission timer expires, which could take a long time compared to the time scale of the physical layer procedures.

This means that the UE may have to keep its receiver circuitry on when it could have shut it off earlier if it could receive positive HARQ-ACK feedback from the eNB to let the UE know that it does not need to stay awake for potential HARQ retransmissions. This would allow the UE to go to sleep earlier when it is configured with Discontinuous Reception (DRX) operation in Radio Resource Control (RRC) connected mode, and also when the UE is being released from RRC connected mode to RRC idle mode and the UE has to stay up long enough to ensure that the eNB has received the Radio Link Control (RLC) ACK sent in uplink in response to the release message sent in downlink.

Introduction of uplink HARQ-ACK feedback signaling in the downlink may result in additional static downlink control signaling overhead and/or reduced coverage for the DCI. As such, systems and methods for addressing this issue are needed.

SUMMARY

Systems and methods for efficient signaling Hybrid Automatic Repeat Request Acknowledgement (HARQ-ACK) for an uplink data transmission are disclosed. In some embodiments, a method of signaling HARQ-ACK feedback for an uplink data transmission sent from a wireless device to a radio network node comprises obtaining HARQ-ACK feedback for the uplink data transmission, encoding the obtained HARQ-ACK feedback on to an unused bit combination of a field in a downlink control channel, and transmitting the downlink control channel to the wireless device. Embodiments of the present disclosure enable wireless device power saving using positive HARQ-ACK feedback without increasing the static downlink control signaling overhead and without reducing coverage for Downlink Control Information (DCI).

In some embodiments, the wireless device is configured to operate in a coverage enhancement mode. In some embodiments, the wireless device is a Bandwidth-Reduced Low-Complexity (BL) User Equipment device (UE).

In some embodiments, the field is a field in an uplink grant portion of the downlink control channel. In some embodiments, the field is a Modulation and Coding Scheme (MCS) index field. Further, in some embodiments, a plurality of bit combinations for the MCS index field are unused for MCS indication for the wireless device, and the unused bit combination is one of the plurality of bit combinations that is predefined as being an indication of a positive HARQ-ACK for a specific uplink HARQ process associated with the uplink data transmission. In some other embodiments, a plurality of bit combinations for the MCS index field are unused for MCS indication for the wireless device, and the unused bit combination is one of the plurality of bit combinations that is predefined as being an indication of a positive HARQ-ACK for all uplink HARQ processes including a specific uplink HARQ process associated with the uplink data transmission.

In some embodiments, the field is a resource block assignment field. Further, in some embodiments, a plurality of bit combinations for the resource block assignment field are unused for resource block assignment for the wireless device, and the unused bit combination is one of the plurality of bit combinations that is predefined as being an indication of a positive HARQ-ACK for a specific uplink HARQ process associated with the uplink data transmission. In some other embodiments, a plurality of bit combinations for the resource block assignment field are unused for resource block assignment for the wireless device, and the unused bit combination is one of the plurality of bit combinations that is predefined as being an indication of a positive HARQ-ACK for all uplink HARQ processes including a specific uplink HARQ process associated with the uplink data transmission.

In some embodiments, obtaining the HARQ-ACK feedback for the uplink data transmission comprises attempting to decode the uplink data transmission from the wireless device and setting the HARQ-ACK feedback to either a positive ACK or a NACK based on an outcome of the attempting to decode the uplink data transmission.

In some embodiments, the method is performed by a network node. In some embodiments, the network node is a radio access node.

Embodiments of a network node are also disclosed. In some embodiments, a network node for signaling HARQ-ACK feedback for an uplink data transmission sent from a wireless device to a radio network node is adapted to obtain HARQ-ACK feedback for the uplink data transmission, encode the obtained HARQ-ACK feedback on to an unused bit combination of a field in a downlink control channel, and transmit the downlink control channel to the wireless device.

In some embodiments, a network node for signaling HARQ-ACK feedback for an uplink data transmission sent from a wireless device to a radio network node comprises one or more processors and memory comprising instructions executable by the one or more processors whereby the network node is operable to obtain HARQ-ACK feedback for the uplink data transmission, encode the obtained HARQ-ACK feedback on to an unused bit combination of a field in a downlink control channel, and transmit the downlink control channel to the wireless device.

Embodiments of a method of operation of a wireless device are also disclosed. In some embodiments, a method of operation of a wireless device to perform an uplink HARQ procedure for an uplink data transmission sent from the wireless device to a radio network node comprises transmitting an uplink data transmission to the radio access node, monitoring for a downlink control channel, decoding the downlink control channel upon detecting a downlink control channel, determining whether a positive HARQ-ACK feedback is encoded onto an unused bit combination of a field in the downlink control channel, and entering a sleep mode upon determining that a positive HARQ-ACK feedback is encoded onto the unused bit combination of the field in the downlink control channel.

In some embodiments, the wireless device is configured to operate in a coverage enhancement mode. In some embodiments, the wireless device is a BL UE.

In some embodiments, the field is a field in an uplink grant portion of the downlink control channel. In some embodiments, the field is an MCS index field. In some embodiments, a plurality of bit combinations for the MCS index field are unused for MCS indication for the wireless device, and the unused bit combination is one of the plurality of bit combinations that is predefined as being an indication of a positive HARQ-ACK for a specific uplink HARQ process associated with the uplink data transmission. In some embodiments, a plurality of bit combinations for the MCS index field are unused for MCS indication for the wireless device, and the unused bit combination is one of the plurality of bit combinations that is predefined as being an indication of a positive HARQ-ACK for all uplink HARQ processes including a specific uplink HARQ process associated with the uplink data transmission.

In some embodiments, the field is a resource block assignment field. In some embodiments, a plurality of bit combinations for the resource block assignment field are unused for resource block assignment for the wireless device, and the unused bit combination is one of the plurality of bit combinations that is predefined as being an indication of a positive HARQ-ACK for a specific uplink HARQ process associated with the uplink data transmission. In some embodiments, a plurality of bit combinations for the resource block assignment field are unused for resource block assignment for the wireless device, and the unused bit combination is one of the plurality of bit combinations that is predefined as being an indication of a positive HARQ-ACK for all uplink HARQ processes including a specific uplink HARQ process associated with the uplink data transmission.

Embodiments of a wireless device are also disclosed. In some embodiments, a wireless device for performing an uplink HARQ procedure for an uplink data transmission sent from the wireless device to a radio network node is adapted to transmit an uplink data transmission to the radio access node, monitor for a downlink control channel, decode the downlink control channel upon detecting a downlink control channel, determine whether a positive HARQ-ACK feedback is encoded onto an unused bit combination of a field in the downlink control channel, and enter a sleep mode upon determining that a positive HARQ-ACK feedback is encoded onto the unused bit combination of the field in the downlink control channel.

In some embodiments, a wireless device for performing an uplink HARQ procedure for an uplink data transmission sent from the wireless device to a radio network node comprises at least one processor and memory comprising instructions executable by the at least one processor whereby the wireless device is operable to transmit an uplink data transmission to the radio access node, monitor for a downlink control channel, decode the downlink control channel upon detecting a downlink control channel, determine whether a positive HARQ-ACK feedback is encoded onto an unused bit combination of a field in the downlink control channel, and enter a sleep mode upon determining that a positive HARQ-ACK feedback is encoded onto the unused bit combination of the field in the downlink control channel.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
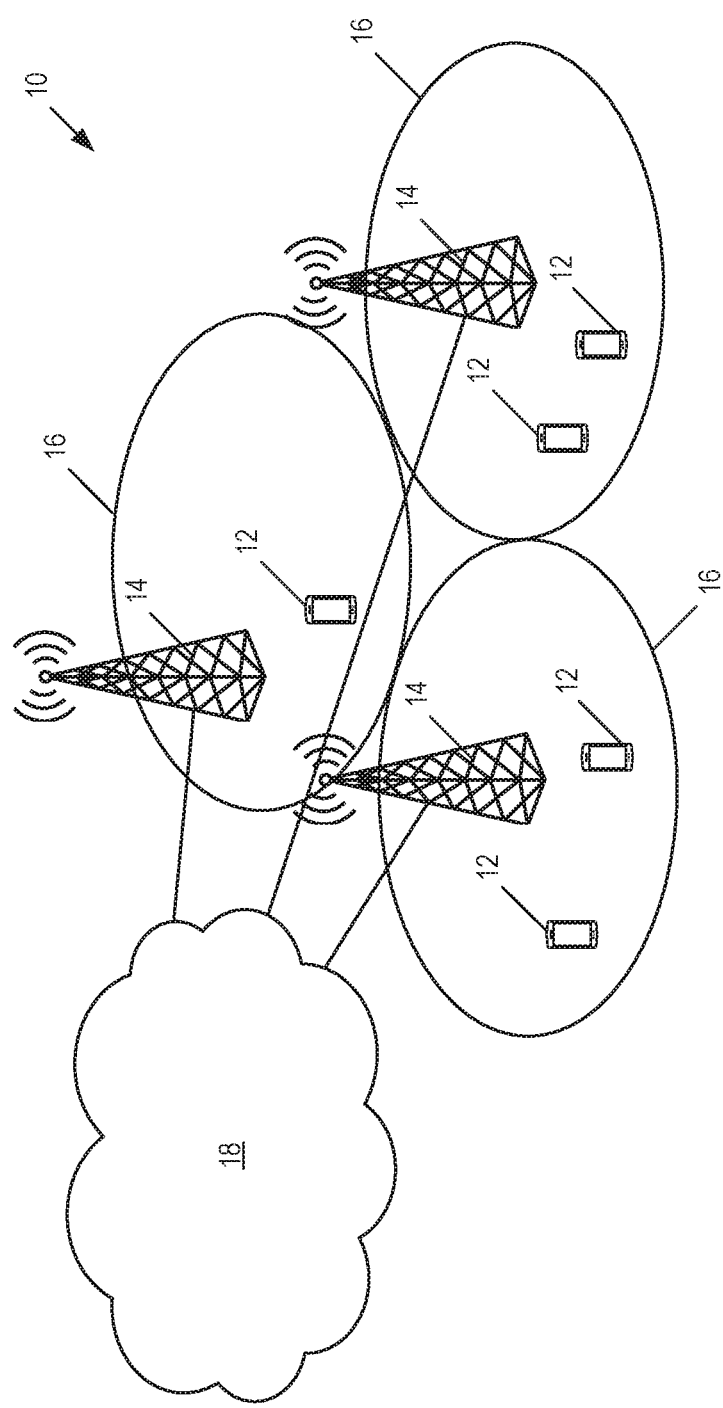
FIG. 1 illustrates one example of a cellular communications network in which embodiments of the present disclosure may be implemented.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP LTE network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

Introduction of uplink Hybrid Automatic Repeat Request Acknowledgement (HARQ-ACK) feedback signaling in the downlink may result in additional static downlink control signaling overhead and/or reduced coverage for the Downlink Control Information (DCI). Systems and methods are disclosed herein to address this issue. In particular, systems and methods are disclosed for providing HARQ-ACK feedback for an uplink data transmission without introducing extra static downlink control signaling overhead by encoding the HARQ-ACK feedback on unused bit combinations of a field in an uplink grant in a DCI. Embodiments of the present disclosure enables UE power saving using positive HARQ-ACK feedback without increasing the static downlink control signaling overhead and without reducing the coverage for the DCI.

FIG. 1 illustrates one example of a cellular communications network 10 (e.g., a Long Term Evolution (LTE) (e.g., LTE Advanced (LTE-A), LTE-Pro, or an enhanced version of LTE) or 5G NR network) in which embodiments of the present disclosure may be implemented. As illustrated, a number of wireless devices 12 (e.g., UEs, Bandwidth-Reduced Low-Complexity (BL)/Coverage Enhancement (CE) UEs) wirelessly transmit signals to and receive signals from radio access nodes 14 (e.g., eNBs or gNBs, which is a 5G NR base station), each serving one or more cells 16. The radio access nodes 14 are connected to a core network 18.

In operation, the radio access nodes 14 and the wireless devices 12 operate in accordance with an uplink HARQ procedure. According to embodiments of the present disclosure, a radio access node 14 sends uplink HARQ-ACK feedback (e.g., a positive HARQ ACK) to a wireless device 12 by encoding the uplink HARQ-ACK feedback onto unused bits in a downlink control channel. In some particular embodiments, the radio access node 14 encodes uplink HARQ-ACK feedback onto an unused bit combination in an uplink grant of a downlink control channel transmitted to the wireless device 12. For a BL/CE UE operating in CE mode A, the uplink HARQ-ACK feedback is encoded onto an unused bit combination in a resource block assignment field of an uplink grant in the downlink control channel. For a BL/CE operating in CE mode B, the uplink HARQ-ACK feedback is encoded onto an unused bit combination in a Modulation and Coding Scheme (MCS) index field of an uplink grant in the downlink control channel. The wireless device 12 monitors for the downlink channel including the uplink HARQ-ACK encoded onto the used bit combination. Upon receiving the uplink HARQ-ACK, the wireless device 12 can, e.g., enter sleep mode at that point rather than, e.g., waiting for a preconfigured HARQ timer to expire.

Figure 2:
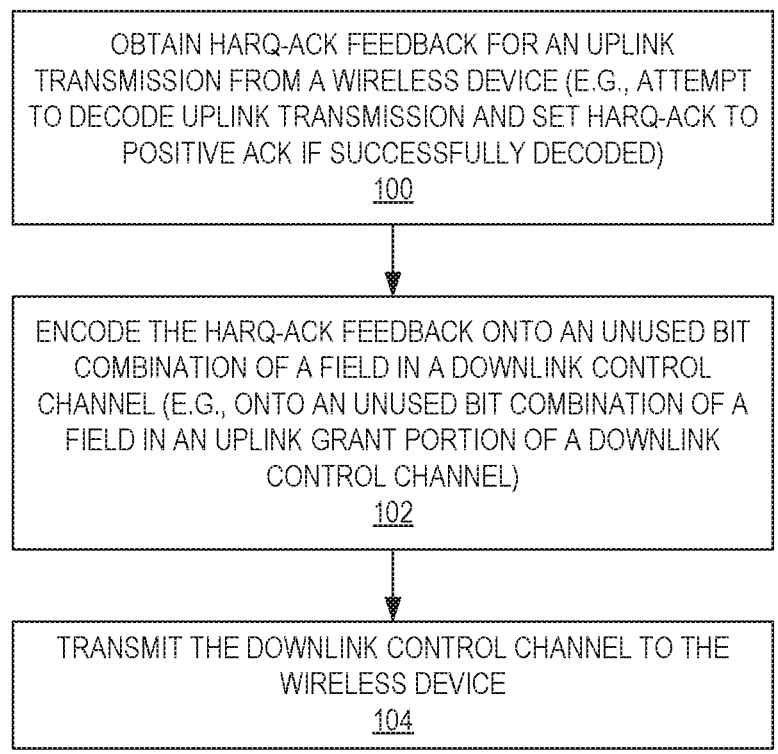
FIG. 2 is a flow chart that illustrates the operation of a network node (e.g., a radio access node) according to some embodiments of the present disclosure.

FIG. 2 is a flow chart that illustrates the operation of a network node (e.g., a radio access node 14) according to some embodiments of the present disclosure. As illustrated, the network node obtains HARQ-ACK feedback for an uplink transmission from a wireless device 12 (step 100). For example, if the network node is a radio access node 14, the radio access node 14 may attempt to decode the uplink transmission from the wireless device 12. If the radio access node 14 is able to successfully decode the uplink transmission, the radio access node 14 determines that a positive HARQ-ACK (i.e., an ACK) is to be transmitted. The network node encodes the HARQ-ACK feedback onto an unused bit combination of a field in a downlink control channel (e.g., onto an unused bit combination of a field in an uplink grant portion of a downlink control channel) (step 102). As discussed below, the particular field used may vary depending on, e.g., the CE mode. The network node then transmits the downlink control channel to the wireless device 12 (step 104).

Additional details are provided below for embodiments in which the wireless device 12 is a BL/CE UE in CE mode A and embodiments in which the wireless device 12 is a BL/CE UE in CE mode B.

For BL/CE UEs, uplink grants are scheduled using DCI format 6-0A in CE mode A [3]. A resource block assignment field in the DCI indicates the Physical Uplink Shared Channel (PUSCH) Physical Resource Block (PRB) allocation. The field consists of {5, 6, 7, 8, 9, 9} bits for a system bandwidth of {1.4, 3, 5, 10, 15, 20} megahertz (MHz). In CE mode B, all possible bit combinations are used, but in CE mode A, only some of the possible bit combinations are used [4][5]. For all possible configurations, at least 11 values are unused in CE mode A, as shown in Table 1.

TABLE 1

PUSCH resource allocation indices in CE mode A

| Configured maximum PUSCH channel bandwidth | System bandwidth | Number of unused values in resource block assignment field in DCI format 6-0A |
|---|---|---|
| 1.4 MHz | 1.4 MHz | 11 |
|  | 3 MHz | 2 * 11 = 22 |
|  | 5 MHz | 4 * 11 = 44 |
|  | 10 MHz | 8 * 11 = 88 |
|  | 15 MHz | 16 * 11 = 176 |
|  | 20 MHz | 16 * 11 = 176 |
| 5 MHz | 1.4 MHz | 11 − 0 = 11 |
|  | 3 MHz | 22 − 3 = 19 |
|  | 5 MHz | 44 − 19 = 25 |
|  | 10 MHz | 88 − 59 = 29 |
|  | 15 MHz | 176 − 99 = 77 |
|  | 20 MHz | 176 − 139 = 37 |

Some of these at least 11 unused values could be used to indicate uplink HARQ-ACK feedback for the up to eight uplink HARQ processes available in CE mode A according to Table 2. However, Table 2 is only an example.

TABLE 2

Uplink HARQ-ACK feedback in CE mode A

| Value | Meaning |
|---|---|
| Unused value 1 | Positive HARQ-ACK for UL HARQ process #0 |
| Unused value 2 | Positive HARQ-ACK for UL HARQ process #1 |
| Unused value 3 | Positive HARQ-ACK for UL HARQ process #2 |
| Unused value 4 | Positive HARQ-ACK for UL HARQ process #3 |
| Unused value 5 | Positive HARQ-ACK for UL HARQ process #4 |
| Unused value 6 | Positive HARQ-ACK for UL HARQ process #5 |
| Unused value 7 | Positive HARQ-ACK for UL HARQ process #6 |
| Unused value 8 | Positive HARQ-ACK for UL HARQ process #7 |
| Unused value 9 | Positive HARQ-ACK for all UL HARQ processes |

For BL/CE UEs, uplink grants are scheduled using DCI format 6-0B in CE mode B [3]. A MCS index is indicated by a 4-bit field in the DCI. The MCS index is used to determine the modulation order and Transport Block Size (TBS) index. In CE mode A, all MCS indices are used. However, for CE mode B, MCS indices larger than 10 are not used [4], meaning that five values are unused in CE mode B, as shown in Table 3.

TABLE 3

PUSCH MCS indices in CE mode B

| MCS index | Modulation order | TBS index |
|---|---|---|
| 0 | 2 | 0 |
| 1 | 2 | 1 |

TABLE 3-continued

PUSCH MCS indices in CE mode B

| MCS index | Modulation order | TBS index |
|---|---|---|
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 2 | 10 |
| 11 | Unused in CE mode B | |
| 12 | | |
| 13 | | |
| 14 | | |
| 15 | | |

Some of these five unused values could be used to indicate uplink HARQ-ACK feedback for the up to two uplink HARQ processes available in CE mode B according to Table 4. However, Table 4 is only an example.

TABLE 4

Uplink HARQ-ACK feedback in CE mode B

| MCS index | Modulation order | TBS index |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 2 | 10 |
| 11 | Positive HARQ-ACK for UL HARQ process #0 | |
| 12 | Positive HARQ-ACK for UL HARQ process #1 | |
| 13 | Positive HARQ-ACK for all UL HARQ processes | |
| 14 | Unused in CE mode B | |
| 15 | | |

Figure 3:
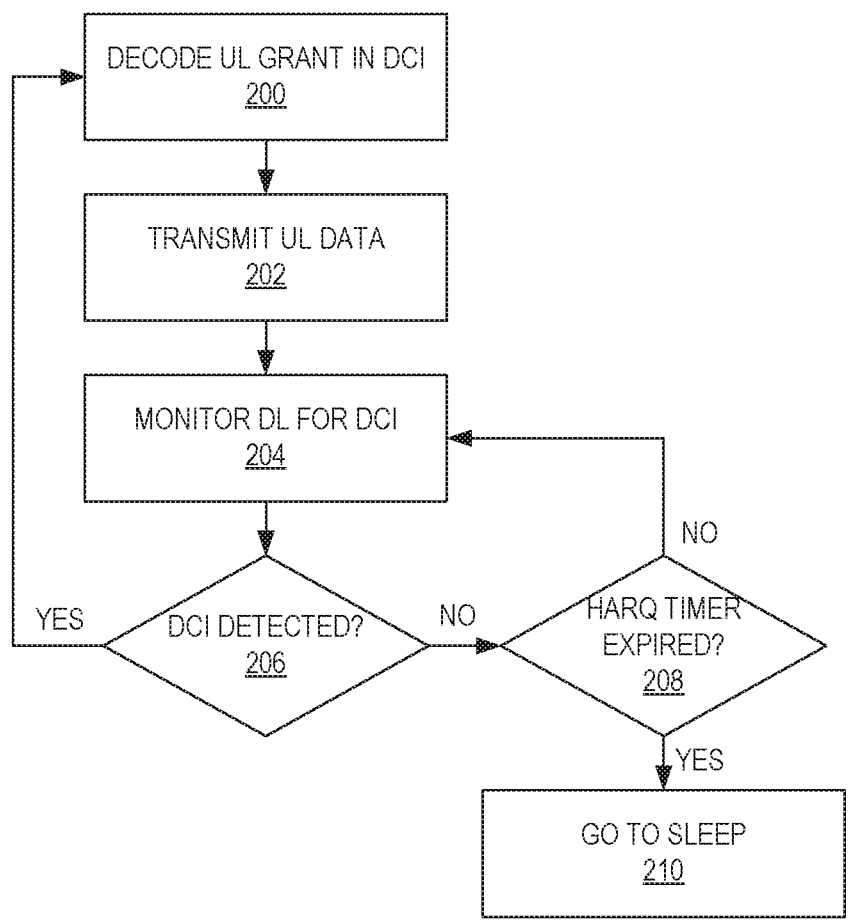
FIG. 3 shows the Long Term Evolution (LTE) Release 13/14 behavior for Bandwidth-Reduced Low-Complexity (BL)/Coverage Enhancement (CE) User Equipment devices (UEs)

FIG. 3 is a flow chart that illustrates the operation of a conventional BL/CE UE in LTE Release 13/14. As illustrated, the UE decodes an uplink grant contained in the DCI transmitted in a downlink control channel (step 200). The UE transmits uplink data in accordance with the uplink grant (step 202). The UE then monitors for DCI (i.e., monitors for a new downlink control channel) (step 204) and determines whether DCI is detected (step 206). If so, the process returns to step 200 and is repeated. However, if no DCI is detected, the UE determines whether a preconfigured HARQ timer has expired (step 208). If not, the process returns to step 204. However, if the HARQ timer has expired and the UE has not received DCI containing a new uplink grant, the UE goes to sleep (step 210).

Figure 4:
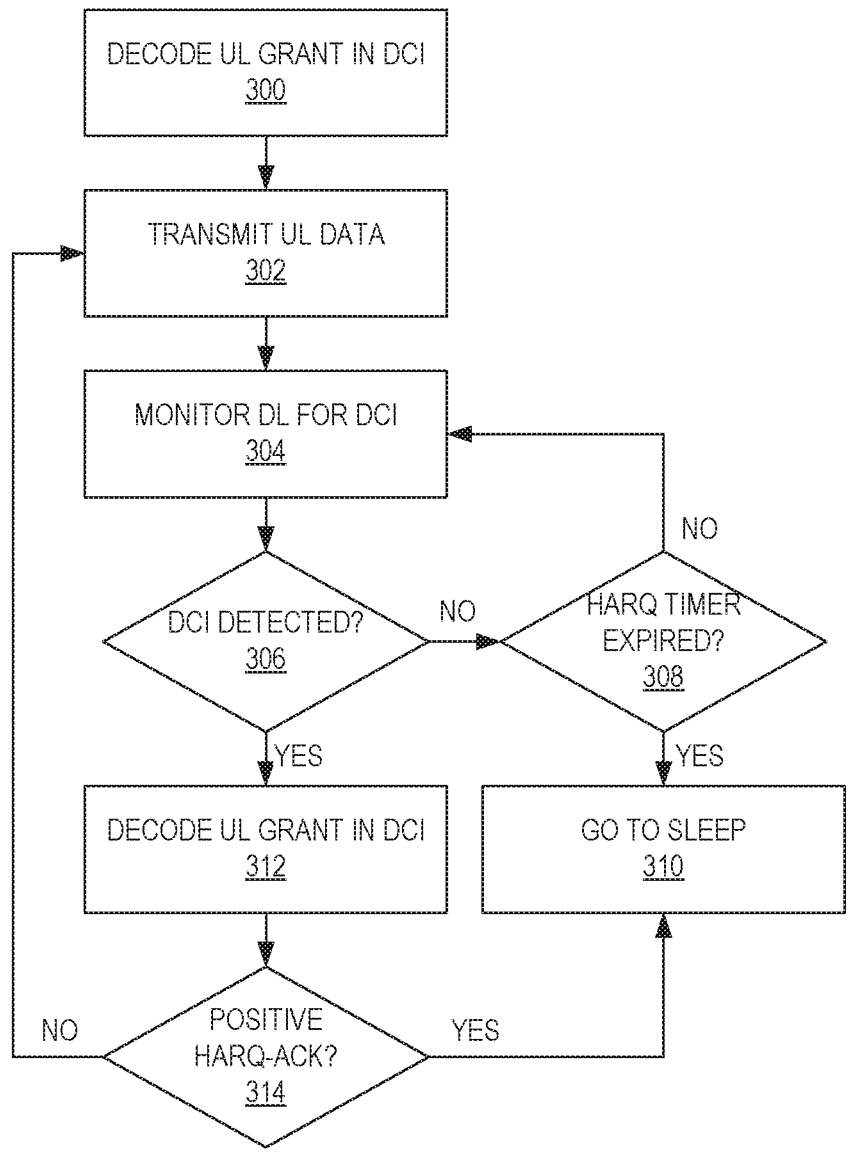
FIG. 4 shows the behavior for BL/CE UEs according to embodiments of the present disclosure.

FIG. 4 is a flow chart that illustrates the operation of a wireless device 12 according to embodiments of the present disclosure. As illustrated, the wireless device 12 decodes an uplink grant contained in the DCI transmitted in a downlink control channel (step 300). The wireless device 12 transmits uplink data in accordance with the uplink grant (step 302). The wireless device 12 then monitors for DCI (i.e., monitors for a new downlink control channel containing new DCI) (step 304) and determines whether DCI is detected (step 306). If no DCI is detected, the wireless device 12 determines whether a preconfigured HARQ timer has expired (step 308). If not, the process returns to step 304. However, if the HARQ timer has expired and the wireless device 12 has not received DCI, the wireless device 12 goes to sleep (step 310).

Returning to step 306, if DCI is detected, the wireless device 12 decodes an uplink grant contained in the DCI (step 312) and determines whether a positive HARQ-ACK is encoded in the uplink grant using a used bit combination within a field of the uplink grant in accordance with embodiments of the present disclosure (step 314). If so, the wireless device 12 goes to sleep (step 310). If not, the process returns to step 302.

Figure 5:
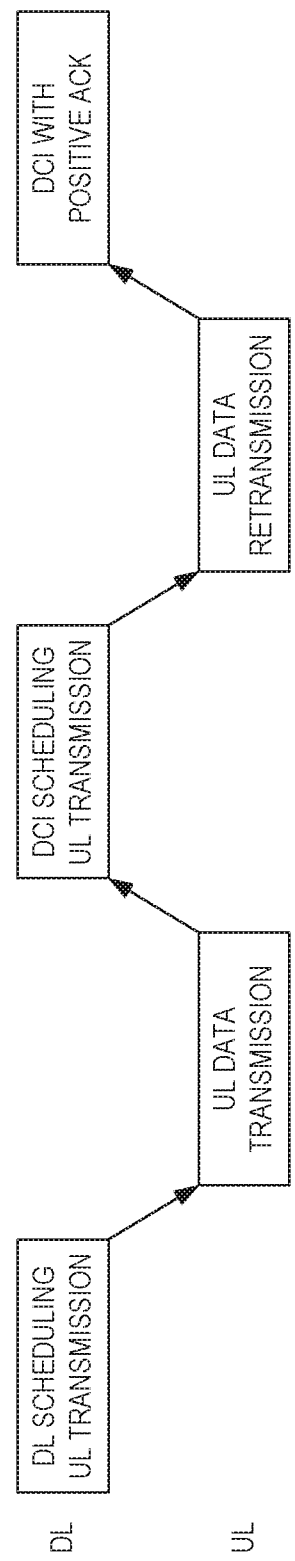
FIG. 5 shows a scheduling example in accordance with at least some embodiments of the present disclosure.

FIG. 5 illustrates a scheduling example according to some embodiments of the present disclosure.

Figure 6:
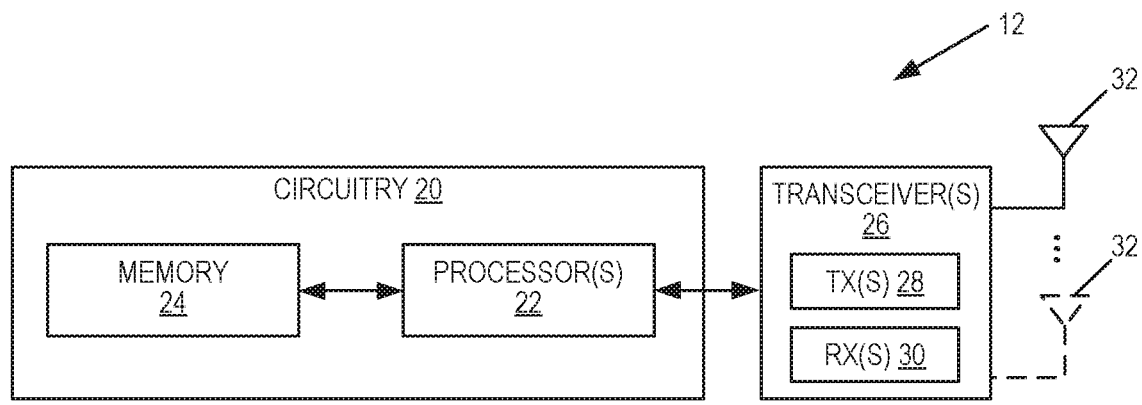
FIGS. 6 and 7 illustrate example embodiments of a wireless device.

FIG. 6 is a schematic block diagram of the wireless device 12 (e.g., UE) according to some embodiments of the present disclosure. As illustrated, the wireless device 12 includes circuitry 20 comprising one or more processors 22 (e.g., Central Processing Units (CPUs), Application Specific Integrated Circuits (ASICs), Field Programmable Gate Arrays (FPGAs), Digital Signal Processors (DSPs), and/or the like) and memory 24. The wireless device 12 also includes one or more transceivers 26 each including one or more transmitters 28 and one or more receivers 30 coupled to one or more antennas 32. In some embodiments, the functionality of the wireless device 12 described above may be implemented in hardware (e.g., via hardware within the circuitry 20 and/or within the processor(s) 22) or be implemented in a combination of hardware and software (e.g., fully or partially implemented in software that is, e.g., stored in the memory 24 and executed by the processor(s) 22).

In some embodiments, a computer program including instructions which, when executed by the at least one processor 22, causes the at least one processor 22 to carry out at least some of the functionality of the wireless device 12 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 7:
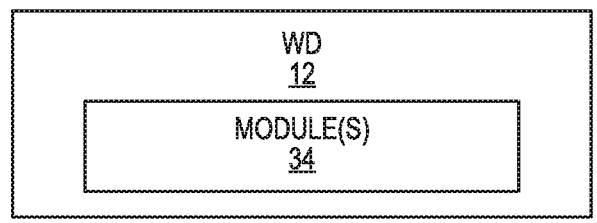

FIG. 7 is a schematic block diagram of the wireless device 12 (e.g., UE) according to some other embodiments of the present disclosure. The wireless device 12 includes one or more modules 34, each of which is implemented in software. The module(s) 34 provide the functionality of the wireless device 12 described herein. For example, the modules(s) 34 may include modules operable to perform the functions of steps 300 through 314 of FIG. 4.

Figure 8:
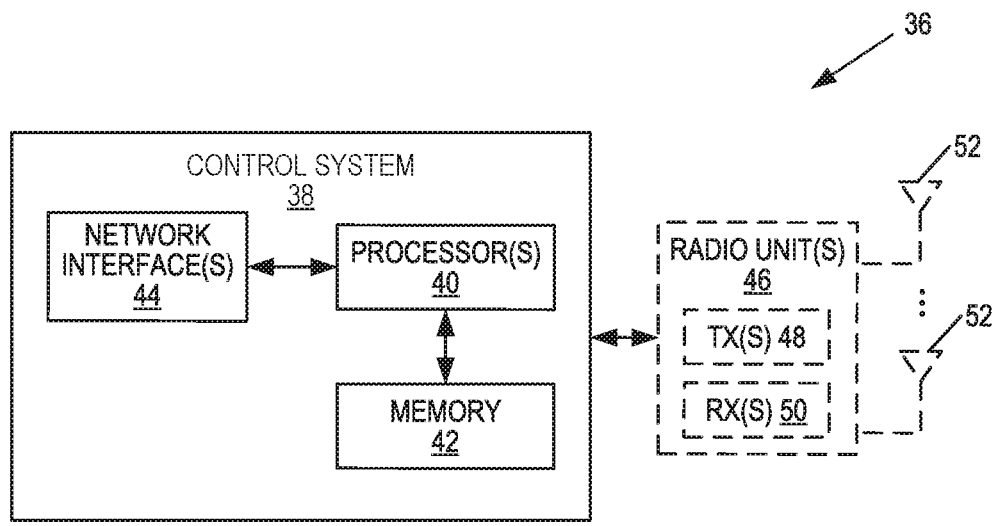
FIGS. 8 through 10 illustrate example embodiments of a network node.

FIG. 8 is a schematic block diagram of a network node 36 (e.g., a radio access node 14 such as, for example, an eNB or gNB) or a core network node according to some embodiments of the present disclosure. As illustrated, the network node 36 includes a control system 38 that includes circuitry comprising one or more processors 40 (e.g., CPUs, ASICs, DSPs, FPGAs, and/or the like) and memory 42. The control system 38 also includes a network interface 44. In embodiments in which the network node 36 is a radio access node 14, the network node 36 also includes one or more radio units 46 that each include one or more transmitters 48 and one or more receivers 50 coupled to one or more antennas 52. In some embodiments, the functionality of the network node 36 described above may be fully or partially implemented in software that is, e.g., stored in the memory 42 and executed by the processor(s) 40.

Figure 9:
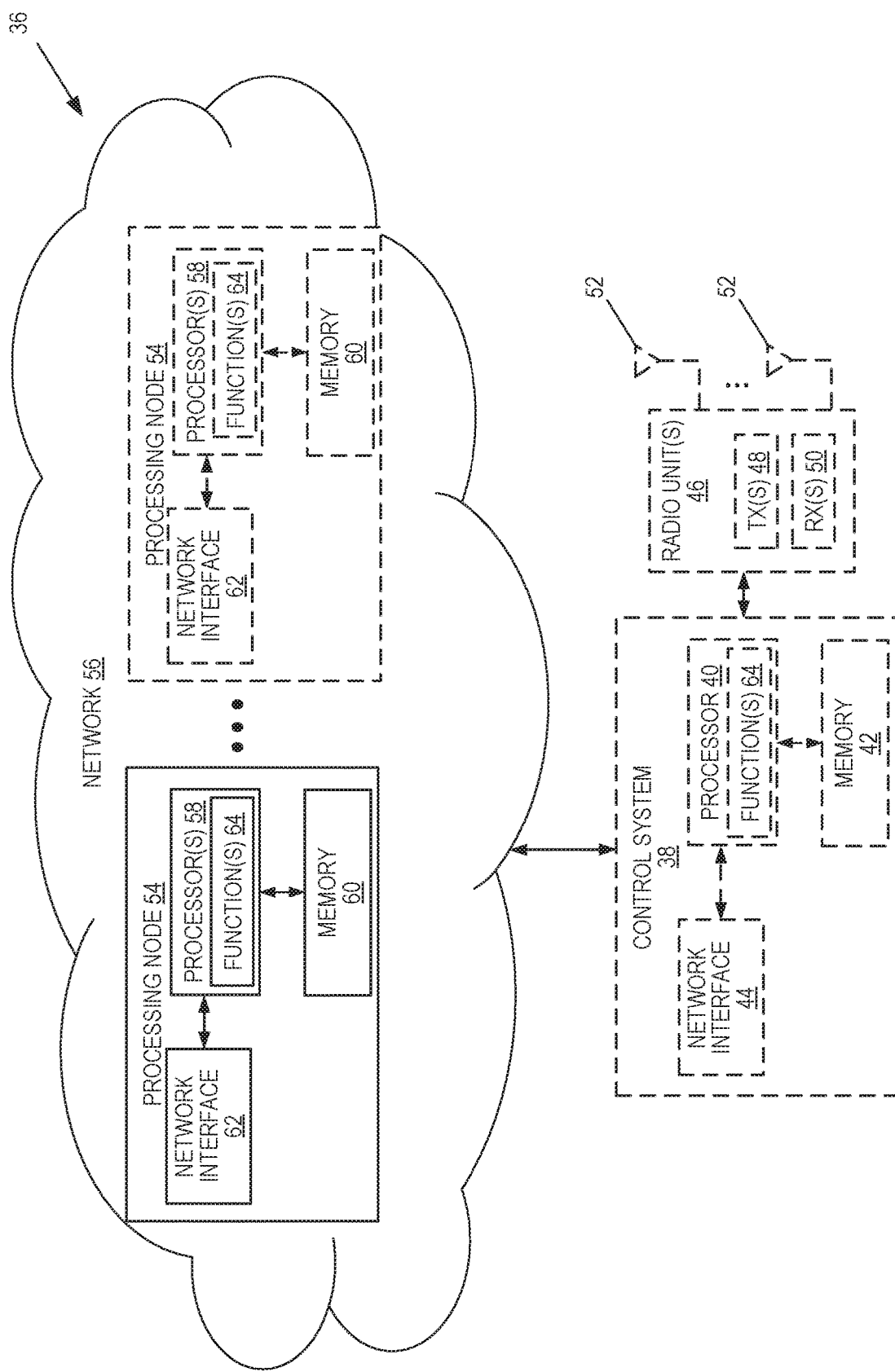

FIG. 9 is a schematic block diagram that illustrates a virtualized embodiment of the network node 36 (e.g., the radio access node 14 or a core network node) according to some embodiments of the present disclosure. As used herein, a "virtualized" network node 36 is a network node 36 in which at least a portion of the functionality of the network node 36 is implemented as a virtual component (e.g., via a virtual machine(s) executing on a physical processing node(s) in a network(s)). As illustrated, the network node 36 optionally includes the control system 38, as described with respect to FIG. 8. In addition, if the network node 36 is the radio access node 14, the network node 36 also includes the one or more radio units 46, as described with respect to FIG. 8. The control system 38 (if present) is connected to one or more processing nodes 54 coupled to or included as part of a network(s) 56 via the network interface 44. Alternatively, if the control system 38 is not present, the one or more radio units 46 (if present) are connected to the one or more processing nodes 54 via a network interface(s). Alternatively, all of the functionality of the network node 36 described herein may be implemented in the processing nodes 54. Each processing node 54 includes one or more processors 58 (e.g., CPUs, ASICs, DSPs, FPGAs, and/or the like), memory 60, and a network interface 62.

In this example, functions 64 of the network node 36 (e.g., the functions of the radio access node 14) described herein are implemented at the one or more processing nodes 54 or distributed across the control system 38 (if present) and the one or more processing nodes 54 in any desired manner. In some particular embodiments, some or all of the functions 64 of the network node 36 described herein are implemented as virtual components executed by one or more virtual machines implemented in a virtual environment(s) hosted by the processing node(s) 54. As will be appreciated by one of ordinary skill in the art, additional signaling or communication between the processing node(s) 54 and the control system 38 (if present) or alternatively the radio unit(s) 46 (if present) is used in order to carry out at least some of the desired functions. Notably, in some embodiments, the control system 38 may not be included, in which case the radio unit(s) 46 (if present) communicates directly with the processing node(s) 54 via an appropriate network interface(s).

In some particular embodiments, higher layer functionality (e.g., layer 3 and up and possibly some of layer 2 of the protocol stack) of the network node 36 may be implemented at the processing node(s) 54 as virtual components (i.e., implemented "in the cloud") whereas lower layer functionality (e.g., layer 1 and possibly some of layer 2 of the protocol stack) may be implemented in the radio unit(s) 46 and possibly the control system 38.

In some embodiments, a computer program including instructions which, when executed by the at least one processor 40, 58, causes the at least one processor 40, 58 to carry out the functionality of the network node 36 or a processing node 54 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 60).

Figure 10:
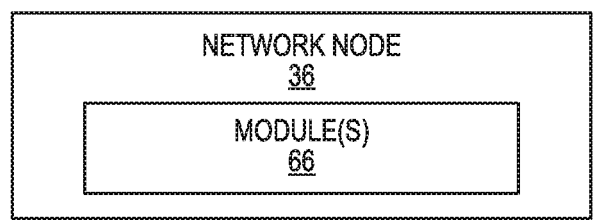

FIG. 10 is a schematic block diagram of the network node 36 (e.g., the radio access node 14 or a core network node) according to some other embodiments of the present disclosure. The network node 36 includes one or more modules 66, each of which is implemented in software. The module(s) 66 provide the functionality of the network node 36 described herein. In some embodiments, the module(s) 66 may comprise, for example, an obtaining module operable to perform the function of step 100 of FIG. 2, an encoding module operable to perform the function of step 102 of FIG. 2, and a transmitting module operable to perform the function of step 104 of FIG. 2.

EXAMPLE EMBODIMENTS

While not being limited thereto, some example embodiments of the present disclosure are provided below.

Embodiment 1: A method of signaling HARQ-ACK feedback for an uplink data transmission sent from a wireless device (12) to a radio network node (14), the method comprising: obtaining (100) HARQ-ACK feedback for the uplink data transmission; encoding (102) the obtained HARQ-ACK feedback on to an unused bit combination of a field in a downlink control channel; and transmitting (104) the downlink control channel to the wireless device (12).

Embodiment 2: The method of embodiment 1, wherein the wireless device (12) is configured to operate in a coverage enhanced mode (which is also referred to herein as a coverage enhancement mode).

Embodiment 3: The method of embodiment 1 or 2 wherein the field is a field in an uplink grant portion of the downlink control channel.

Embodiment 4: The method of embodiment 3, wherein the field is an MCS index field.

Embodiment 5: The method of embodiment 3, wherein the field is a resource block assignment field.

Embodiment 6: The method of any one of embodiments 1 to 5 wherein the method is performed by a network node.

Embodiment 7: The method of embodiment 6 wherein the network node is a radio access node.

Embodiment 8: A network node for signaling HARQ-ACK feedback for an uplink data transmission sent from a wireless device (12) to a radio network node (14), the network node adapted to perform the method of any one of embodiments 1 to 7.

Embodiment 9: A computer program comprising instructions which, when executed on at least one processor, cause the at least one processor to carry out the method according to any one of embodiments 1 to 7.

Embodiment 10: A carrier containing the computer program of embodiment 9, wherein the carrier is one of an electronic signal, an optical signal, a radio signal, or a computer readable storage medium.

Embodiment 11: A network node for signaling HARQ-ACK feedback for an uplink data transmission sent from a wireless device (12) to a radio network node (14), the network node comprising: at least one processor; and memory comprising instructions executable by the at least one processor whereby the network node is operable to perform the method of any one of embodiments 1 to 7.

Embodiment 12: A network node for signaling HARQ-ACK feedback for an uplink data transmission sent from a wireless device (12) to a radio network node (14), the network node comprising: one or more modules operable to perform the method of any one of embodiments 1 to 7.

Embodiment 13: A method of operation of a wireless device (12) to perform an uplink HARQ procedure for an uplink data transmission sent from the wireless device (12) to a radio network node (14), the method comprising: transmitting (302) an uplink data transmission to the radio access node (14); monitoring (304) for a downlink control channel; upon detecting a downlink control channel (306, YES), decoding the downlink control channel; determining (314) whether a positive HARQ-ACK feedback is encoded onto an unused bit combination of a field in the downlink control channel; and upon determining that a positive HARQ-ACK feedback is encoded onto the unused bit combination of the field in the downlink control channel, entering (310) a sleep mode.

Embodiment 14: The method of embodiment 13, wherein the wireless device (12) is configured to operate in a coverage enhanced mode.

Embodiment 15: The method of embodiment 13 or 14 wherein the field is a field in an uplink grant portion of the downlink control channel.

Embodiment 16: The method of embodiment 15, wherein the field is an MCS index field.

Embodiment 17: The method of embodiment 15, wherein the field is a resource block assignment field.

Embodiment 18: A wireless device (12) for performing an uplink HARQ procedure for an uplink data transmission sent from the wireless device (12) to a radio network node (14), the wireless device (12) adapted to perform the method of any one of embodiments 13 to 17.

Embodiment 19: A computer program comprising instructions which, when executed on at least one processor, cause the at least one processor to carry out the method according to any one of embodiments 13 to 17.

Embodiment 20: A carrier containing the computer program of embodiment 19, wherein the carrier is one of an electronic signal, an optical signal, a radio signal, or a computer readable storage medium.

Embodiment 21: A wireless device (12) for performing an uplink HARQ procedure for an uplink data transmission sent from the wireless device (12) to a radio network node (14), the wireless device (12) comprising: at least one processor (22); and memory (24) comprising instructions executable by the at least one processor (22) whereby the wireless device (12) is operable to perform the method of any one of embodiments 13 to 17.

Embodiment 22: A wireless device (12) for performing an uplink HARQ procedure for an uplink data transmission sent from the wireless device (12) to a radio network node (14), the wireless device (12) comprising: one or more modules (34) operable to perform the method of any one of embodiments 13 to 17.

The following acronyms are used throughout this disclosure.

| | |
|---|---|
| 3GPP | Third Generation Partnership Project |
| 5G | Fifth Generation |
| ACK | Acknowledgement |
| ASIC | Application Specific Integrated Circuit |
| BL | Bandwidth-Reduced Low-Complexity |
| CE | Coverage Enhancement |
| CPU | Central Processing Unit |
| DCI | Downlink Control Information |
| DRX | Discontinuous Reception |
| DSP | Digital Signal Processor |
| eNB | Enhanced or Evolved Node B |
| FPGA | Field Programmable Gate Array |
| gNB | New Radio Base Station |
| HARQ | Hybrid Automatic Repeat Request |
| LTE | Long Term Evolution |
| LTE-A | Long Term Evolution Advanced |
| MCS | Modulation and Coding Scheme |
| MHz | Megahertz |
| MME | Mobility Management Entity |
| MTC | Machine Type Communication |
| NDI | New Data Indicator |
| NR | New Radio |
| P-GW | Packet Data Network Gateway |

| | |
|---|---|
| PRB | Physical Resource Block |
| PUSCH | Physical Uplink Shared Channel |
| RLC | Radio Link Control |
| RRC | Radio Resource Control |
| SCEF | Service Capability Exposure Function |
| TBS | Transport Block Size |
| UE | User Equipment |

Those skilled in the art will recognize improvements and modifications to the embodiments of the present disclosure. All such improvements and modifications are considered within the scope of the concepts disclosed herein.

LIST OF REFERENCES

[1] 3GPP TS 36.306 V14.2.0, "Evolved Universal Terrestrial Radio Access (E-UTRA); User Equipment (UE) radio access capabilities (Release 14)," March 2017.

[2] 3GPP TS 36.211 V14.2.0, "Evolved Universal Terrestrial Radio Access (E-UTRA); Physical channels and modulation (Release 14)," March 2017.

[3] 3GPP TS 36.212 V14.2.0, "Evolved Universal Terrestrial Radio Access (E-UTRA); Multiplexing and channel coding (Release 14)," March 2017.

[4] 3GPP TS 36.213 V14.2.0, "Evolved Universal Terrestrial Radio Access (E-UTRA); Physical layer procedures (Release 14)," March 2017.

[5] RP-170732, "New WID on Even further enhanced MTC for LTE," RAN #75, March 2017.

[6] 3GPP TS 36.321 V14.2.0, "Evolved Universal Terrestrial Radio Access (E-UTRA); Medium Access Control (MAC) protocol specification (Release 14)," March 2017.

[7] R1-1703969, "WF on Resource Allocation for FeMTC UEs with 5 MHz PUSCH Channel Bandwidth," Huawei, HiSilicon, Ericsson, Qualcomm, Softbank, Lenovo, Motorola Mobility, Sharp, RAN1 #88, February 2017.

What is claimed is:

1. A method of operation of a network node for signaling Hybrid Automatic Repeat Request Acknowledgment, HARQ-ACK, feedback for an uplink data transmission sent from a wireless device to a radio network node, the method comprising:
obtaining HARQ-ACK feedback for the uplink data transmission;
encoding the HARQ-ACK feedback obtained on to an unused bit combination of a resource block assignment field in a downlink control channel, wherein a plurality of bit combinations for the resource block assignment field are unused for resource block assignment for the wireless device and the unused bit combination is one of the plurality of bit combinations that is predefined as being an indication of a positive HARQ-ACK for a specific uplink HARQ process associated with the uplink data transmission; and
transmitting the downlink control channel to the wireless device.

2. The method of claim 1 wherein the wireless device is configured to operate in a coverage enhancement mode, wherein enhanced coverage is provided using subframe repetition in LTE physical channels.

3. The method of claim 1 wherein the wireless device is a bandwidth-reduced low-complexity user equipment device that supports a smaller maximum transport block size and a smaller maximum channel bandwidth.

4. The method of claim 1 wherein: a plurality of bit combinations for the MCS index field are unused for MCS indication for the wireless device; and the unused bit combination is one of the plurality of bit combinations that is predefined as being an indication of a positive HARQ-ACK for all uplink HARQ processes including a specific uplink HARQ process associated with the uplink data transmission and including the HARQ-ACK feedback obtained.

5. The method of claim 1 wherein the field is a resource block assignment field.

6. The method of claim 1 wherein obtaining the HARQ-ACK feedback for the uplink data transmission comprises attempting to decode the uplink data transmission from the wireless device and setting the HARQ-ACK feedback to either a positive ACK or a Negative Acknowledgment, NACK, based on an outcome of the attempting to decode the uplink data transmission.

7. The method of claim 1 wherein the network node is a radio access node.

8. A method of operation of a network node for signaling Hybrid Automatic Repeat Request Acknowledgment, HARQ-ACK, feedback for an uplink data transmission sent from a wireless device to a radio network node, the method comprising:
obtaining HARQ-ACK feedback for the uplink data transmission;
encoding the HARQ-ACK feedback obtained on to an unused bit combination of a resource block assignment field in a downlink control channel, wherein a plurality of bit combinations for the resource block assignment field are unused for resource block assignment for the wireless device and the unused bit combination is one of the plurality of bit combinations that is predefined as being an indication of a positive HARQ-ACK for all uplink HARQ processes including the specific uplink HARQ process associated with the uplink data transmission and including the HARQ-ACK feedback obtained; and
transmitting the downlink control channel to the wireless device.

9. A method performed by a wireless device for receiving Hybrid Automatic Repeat Request Acknowledgment, HARQ-ACK, feedback signaling for an uplink data transmission sent from the wireless device to a radio network node, the method comprising:
receiving a downlink control channel from the radio network node;
decoding the downlink control channel;
determining if an unused bit combination of a resource block assignment field in the downlink control channel indicates a positive HARQ-ACK, wherein a plurality of bit combinations for the resource block assignment field are unused for resource block assignment for the wireless device and the unused bit combination is one of the plurality of bit combinations that is predefined as being an indication of a positive HARQ-ACK for a specific uplink HARQ process associated with the uplink data transmission,
determining the uplink data was correctly received by the radio network node responsive to the unused bit combination of the resource block assignment field in the downlink control channel indicates a positive HARQ-ACK.

10. The method of claim 9 wherein the wireless device is configured to operate in a coverage enhancement mode, wherein enhanced coverage is provided using subframe repetition in LTE physical channels.

11. The method of claim 9 wherein the wireless device is a bandwidth-reduced low-complexity user equipment device that supports a smaller maximum transport block size and a smaller maximum channel bandwidth.

\* \* \* \* \*